United States Patent [19]

Takayama

[11] 3,822,695
[45] July 9, 1974

[54] CATHETER SYSTEM
[75] Inventor: Syuichi Takayama, Tokyo, Japan
[73] Assignee: Olympus Optical Co. Ltd., Tokyo, Japan
[22] Filed: Dec. 27, 1972
[21] Appl. No.: 318,994

[30] Foreign Application Priority Data
Dec. 29, 1971 Japan.............................. 46-1442

[52] U.S. Cl............. 128/2 L, 128/2 A, 128/2.05 D
[51] Int. Cl......................... A61b 5/02, G01n 33/16
[58] Field of Search....... 128/2 L, 2 A, 2 G, 2.05 D, 128/2.05 G, 2.05 R; 356/41

[56] References Cited
UNITED STATES PATENTS

| | | | |
|---|---|---|---|
| 3,136,310 | 6/1964 | Meltzer | 128/2 L |
| 3,215,135 | 11/1965 | Franke | 128/2.05 D |
| 3,249,105 | 5/1966 | Polanyi | 128/2.05 D |
| 3,273,447 | 9/1966 | Frank | 128/2.05 D |
| 3,461,856 | 8/1969 | Polanyi | 128/2 L |
| 3,647,299 | 3/1972 | Lavallee | 128/2 L X |
| 3,690,769 | 9/1972 | Mori | 356/41 |

OTHER PUBLICATIONS
Johnson, C. C. et al., J.A.A.M.I., Vol. 5, No. 2, March–April 1971, pp. 77–83.

Primary Examiner—Kyle L. Howell
Attorney, Agent, or Firm—Robert Osann

[57] ABSTRACT

A catheter system in which an optical fiber bundle has one end divided into first, second and third sections and the other end so shaped as to be covered with an elastic film which is elastically deflectable under an external force and permit insertion into the blood vessel. When light including light signals of 8,050 Å, 6,600 Å and 5,300 Å is transmitted from said first section to said other end, the light signals of 8,050 Å and 6,600 Å are reflected from the blood to said second section through said elastic film and the light signal of 5,300 Å is reflected from said elastic film to said third section. A first detector associated with said second section alternately detects the light signals of 8,050 Å and 6,600 Å and produces first and second corresponding electrical signals as a serial output which is corrected by an electrical signal corresponding to the light signal of 5,300 Å and generated from a second detector to provide an electrical signal required for obtaining information on the percentage content of oxygen contained in the blood. Since the elastic film may elastically deflect with variation in the blood pressure to vary the amount of the light of 5,300 Å reflected from the elastic film, information on the blood pressure may be obtained from the second detector.

6 Claims, 13 Drawing Figures

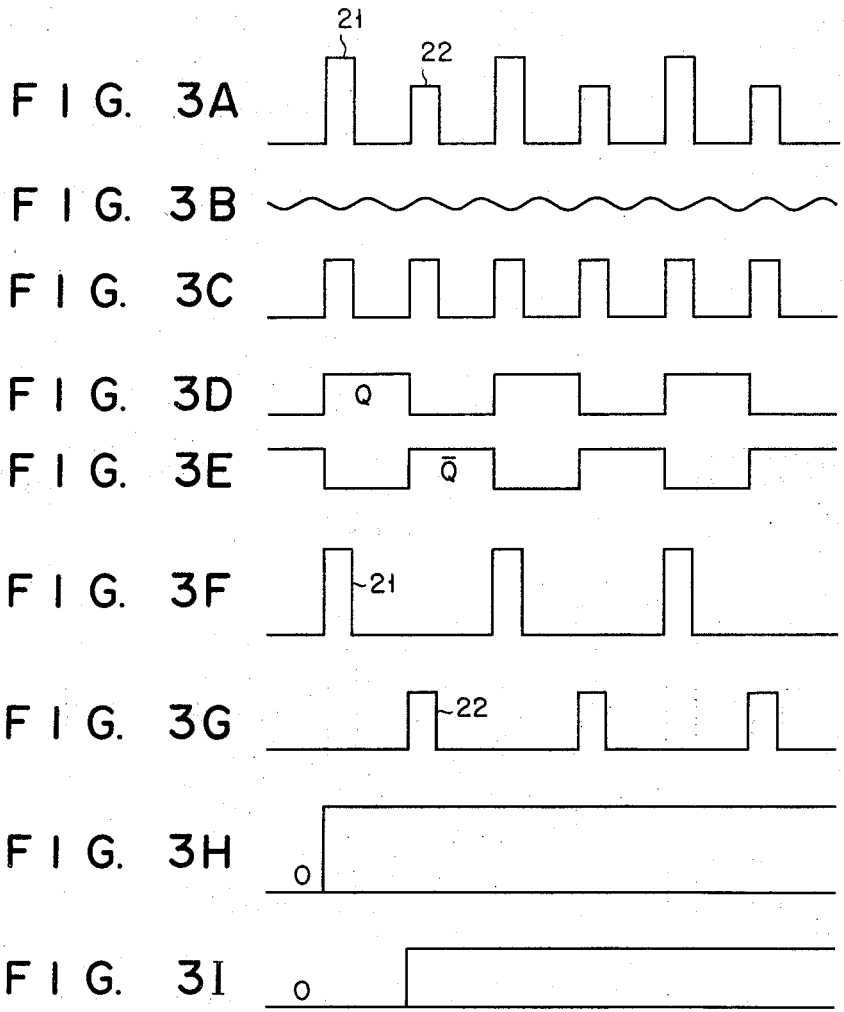

／3,822,695

CATHETER SYSTEM

BACKGROUND OF THE INVENTION

This invention relates to a catheter system designed simultaneously to obtain measurements on the blood pressure and the percentage content of oxygen contained in the blood by inserting the one end of an optical fiber bundle into the blood.

As is well known, carbohemoglobin and oxyhemoglobin in the blood are different in light absorption spectrum. The carbohemoglobin and oxyhemoglobin have the like absorption rate for a light of about 8,000 A in the infrared region, but the former has much larger absorption rate than the latter for a light of 6,000 A to 7,500 A in the red light region. In other words, the infrared rays are reflected by the carbohemoglobin and oxyhemoglobin at the same rate and more red light is reflected by the oxyhemoglobin than by the carbohemoglobin.

The percentage content of oxygen contained in the blood, that is, the ratio of oxyhemoglobin to carbohemoglobin is obtained by irradiating light including the infrared rays and red light through a catheter formed of an optical fiber whose one end is inserted into the blood, individually detecting the amount of light reflected from the carbohemoglobin and oxyhemoglobin, and determining the ratio of the amount of light.

It is often required to measure the blood pressure during measurement of the percentage content of oxygen in the blood. To meet this requirement, it is generally necessary to use an additional catheter for measuring the blood pressure. This is, of course, inconvenient in preparing for the measurement, and moreover the patient will suffer from bleeding.

SUMMARY OF THE INVENTION

It is an object of this invention to provide a catheter system which enables measurement of both the blood pressure and the percentage content of oxygen contained in the blood only by inserting the one end of a catheter formed of an optical fiber bundle into the blood vessel.

In accordance with the preferred embodiment of the present invention, the catheter system enables measurement of the percentage content of oxygen contained in the blood by irradiating light to the blood through an optical fiber bundle which is inserted into the blood vessel at one end and receives light at the other end, and sensing the light reflected from the blood, characterized in that said optical fiber bundle is covered with an elastic film at said one end and divided into first, second and third sections at said other end, and said catheter system comprises a light source associated with said first section and irradiating light including light signals of 8,050 A, 6,600 A and 5,300 A, a first detecting unit associated with said second section alternately to detect the light signals of 8,050 A and 6,600 A and produce the first and second corresponding signals, a second detecting unit associated with said third section to detect the light signal of 5,300 A and produce the corresponding electrical signal, correcting means for correcting by an electrical output signal from said second detector unit an error signal which corresponds to the light signal reflected from said elastic film and is contained in an electrical output signal from said first detecting unit, and means for generating signals representing the blood pressure and the percentage content of oxygen contained in the blood from output signals of said correcting means and second detecting unit.

BRIEF DESCRIPTION OF THE DRAWING

FIGS. 3A to 3I are wave forms illustrating operation of the catheter system shown in FIG. 1; and FIGS. 4A and 4B are graphs illustrating operation of the catheter system shown in FIG. 1.

DETAILED DESCRIPTION OF THE PREFERRED EMBODIMENT

Figure 1:
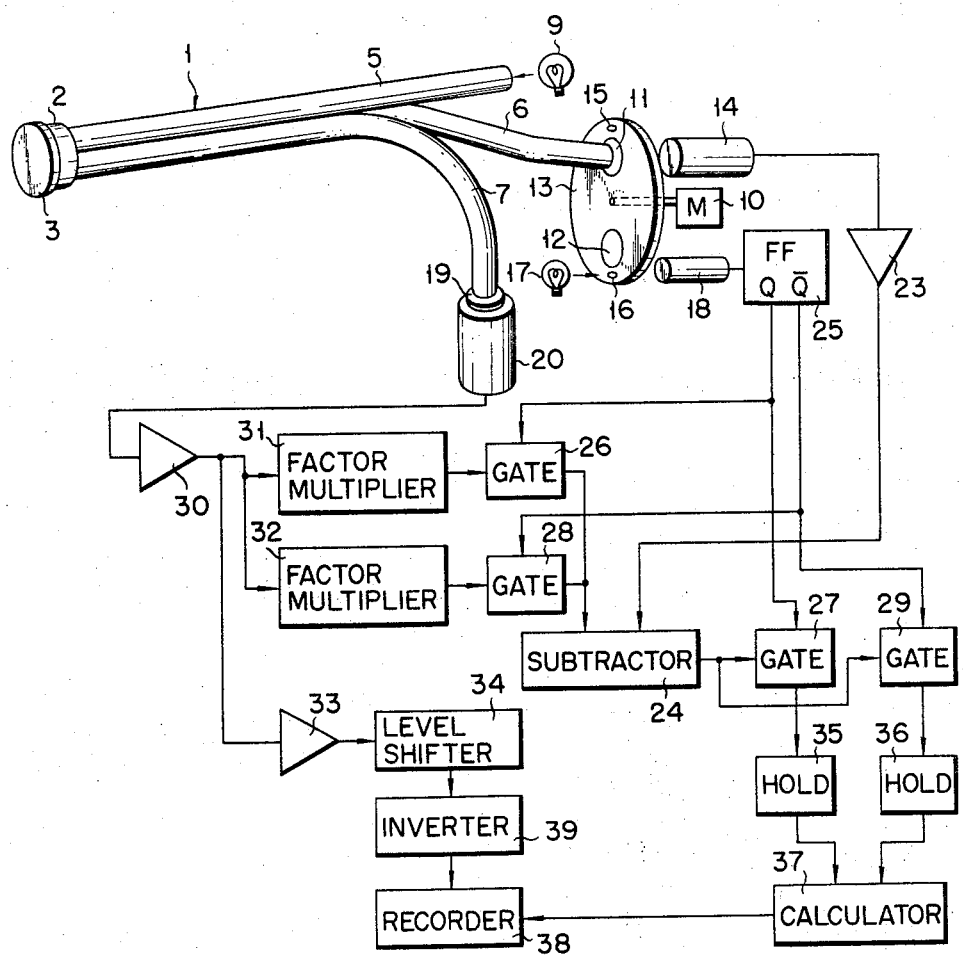
FIG. 1 is a block diagram illustrating a catheter system in accordance with the present invention.
Figure 2:
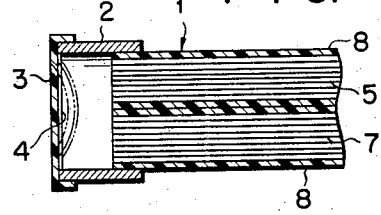
FIG. 2 is an enlarged cross-sectional view of one end of the optical fiber bundle shown in FIG. 1.

There is shown in FIGS. 1 and 2 an optical fiber bundle 1 on one end of which is mounted a cylindrical spacing member 2 whose opening end is closed with an elastic film 3. The elastic film 3 is made of elastic plastics such as polyester, polyurethane or silicone resin and has inner surface coated with suitable metal compound such as magnesium fluoride, selenium dioxide or sodium fluoroaluminate to provide a reflection surface 4. The reflection surface 4 reflects a light having wavelength smaller than 6,500 A and passes a light having a wavelength larger than 6,600 A. The end face of the bundle 1 facing the reflection surface 4 is smoothed out so as to provide a mirror-like surface.

The optical fiber bundle 1 comprises first, second and third sections 5, 6 and 7 coated with protection films 8, respectively. The three sections 5, 6 and 7 are, as mentioned above, tied up by the cylindrical spacing member 2 into unity at one end, and separated individually at the other end. A light source 9 which produces a light including light signals of 8,050 A, 6,600 A and 5,300 A is arranged adjacent to the end face of the first section 5. A phototube 14 is disposed adjacent to the end face of the second section 6 through a rotation disc 13 driven by a motor 10 and having filters 11 and 12 which can pass only the light of 8,050 A and 6,600 A, respectively. Holes 15 and 16 are formed at the places corresponding to the respective filters 11 and 12 through the disc 13 so that light from a light source 17 may be intermittently transmitted to a phototube 18 through the hole 15 or 16. A phototube 20 is positioned adjacent to the end face of the third section 7 through a filter 19 which passes only the light of 5,300 A.

There is shown in FIG. 3A an output signal from the phototube 14. The output signal includes a signal 21 corresponding to the light signal of 8,050 A emitted from the light source 9 and reflected from carbohemoglobin and oxyhemoglobin through the elastic film 3 and a signal 22 corresponding to the light signal of 6,600 A reflected mainly from oxyhemoglobin. The signals 21 and 22 appear alternately in said output signal. The output signal also includes a signal component corresponding to light signals of 8,050 A and 6,600 A reflected from the elastic film 3. As shown in FIG. 3C, a series of pulse signals synchronized with the signals 21 and 22 are generated from the phototube 18. The phototube 20 produces an electrical signal (FIG. 3B) corresponding to the light signal of 5,300 A reflected from the elastic film 3. Since the elastic film 3, as illustrated by dotted lines in FIG. 2, elastically deflects with variation in the blood pressure resulting from the beating of the heart and the amount of light reflected from the elastic film 3 varies with the degree to which the film 3 deflects, an output signal of the phototube 20 changes periodically as shown in FIG. 3B.

After being amplified by an amplifier 23, the output of the phototube 14 is applied to a subtractor 24. The output of the phototube 18 is applied to the trigger terminal of a flip-flop 25 causing the flip-flop 25 to produce output signals Q and $\bar{Q}$ (FIGS. 3D and 3E) with opposite polarities. The signal Q is applied to gate circuits 26 and 27 and the signal $\bar{Q}$ is applied to gate circuits 28 and 29. After being amplified by an amplifier 30, the output signal of the phototube 20 is applied to factor multipliers 31 and 32, and a level shifter 34 through an operational amplifier 33. It is desirable that the output of the phototube 14 should have only electrical signal components corresponding to the light signals of 8,050 A and 6,600 A reflected from the blood through the elastic film 3. In practice, however, the output signal would include an error signal component corresponding to the light signals of 8,050 A and 6,600 A reflected from the elastic film 3, resulting in erroneous measurement of the percentage content of oxygen contained in the blood. The error signal component varies as the elastic film 3 elastically deflects and in consequence it becomes in synchronization with the output signal of the phototube 20. In this embodiment, correction for the error signal component is achieved by subtracting signals passing through factor multipliers 31 and 32 from individual signal components 21 and 22. In other words, when the signal component 21 is produced, the gate 26 is opened by the output Q from the flip-flop 25 and an output from the factor multiplier 31 is applied to a subtractor 24 so as to correct the signal component 21. During the presence of the signal component 22, the gate 28 is opened by the output $\bar{Q}$ from the flip-flop 25 and an output from the factor multiplier 32 is applied to the subtractor 24 so as to correct the signal component 22. The signal components 21 and 22 from the phototube 14 are thus corrected by the subtractor 24 and applied to gates 27 and 29, respectively. Since the gate 27 receives at the other input terminal the output Q from the flip-flop 25 in synchronization with the signal component 21 shown in FIG. 3A, only the signal component 21 can be transmitted to a hold circuit through the gate 27 as shown in FIG. 3F. Likewise, as shown in FIG. 3G, only the signal component 22 can be transmitted to a hold circuit 36 through the gate 29. The hold circuits 35 and 36 hold the level of the voltage applied thereto, the output from the hold circuit 35 being a d.c. output (FIG. 3H) whose level corresponds to an amplitude of the signal component 21 and an output from the hold circuit 36 being a d.c. output (FIG. 3I) whose level corresponds to an amplitude of the signal component 22. If the level of the output from the hold circuit 35 corresponding to the light signal of 8,050 A is $I_1$ and the level of the output from the hold circuit 36 corresponding to the light signal of 6,600 A is $I_2$, then the subsequent equation is experimentally obtained showing the relationship between the output levels $I_1$ and $I_2$, and the percentage content $Os$ (%) of oxygen contained in the blood.

$$Os\ (\%) = \alpha - \beta(I_1/I_2) \quad (1)$$

where $\alpha, \beta$ = constant determined by the type and characteristics of the construction elements of measuring device and measuring conditions Therefore, the percentage content of oxygen is easily obtained by applying output signals of hold circuits 35 and 36 to a calculator 37 and performing calculation according to the equation (1). An output of the calculator 37 is transmitted to a recorder 38, if required, so as to record the percentage content of oxygen contained in the blood.

As shown in FIG. 2, since the rate of the light of 5,300 A reflected from reflection surface 4 is inversely proportional to the degree to which the elastic film 3 deflects, the relation between the blood pressure and an output of the operational amplifier 33 may be linear as shown in FIG. 4A. The output of the amplifier 33 is applied to a level shifter 34 so that an output of the shifter 34 becomes zero when there is no deflection in the elastic film 3. The output of the level shifter 34 may be inverted by an inverter 39 to provide an output characteristic shown in FIG. 4B. The output of the inverter 39 may be applied to the recorder 38 to record the blood pressure.

What is claimed is:

1. A catheter system for simultaneously measuring in vivo the oxygen content and pressure of blood comprising:

an optical fiber bundle adapted to be inserted into a blood vessel, said bundle being divided into three sections, the first optically connected to a source emitting light signals of 8,050 A, 6,600 A, and 5,300 A, the second for receiving inflected light signals of 8,050 A and 6,600 A, and the third for receiving reflected light signals of 5,300 A;

an elastic, deformable film spaced from and covering the end of said bundle opposing the light source and capable of transmitting light signals of 8,050 A and 6,600 A but reflecting signals of 5,300 A;

a first detecting means associated with said second fiber bundle section for alternately receiving, detecting and converting into corresponding electrical signals, light signals of 8,050 A and 6,600 A from said second fiber bundle section reflected from the blood and including an error component reflected from said elastic film;

a second detecting means associated with said third fiber bundle section for receiving, detecting and converting into corresponding electrical signals, light signals of 5,300 A from said third fiber bundle section reflected from said elastic film;

correcting means connected with the output electrical signals from each of the two aforesaid detecting means for subtracting from the electrical signals generated by the reflected light of 8,050 A and 6,600 A the electrical signals generated by the reflected light of 5,300 A which corresponds to the error component reflected from said elastic film at 8,050 A and 6,600 A;

first means for receiving signals from said correcting means and converting the same into signals representing the percentage content of oxygen contained in the blood; and second means connected to the second detecting means for providing electrical signals corresponding to those reflected from the elastic film at 5,300 A representing blood pressure.

2. A catheter system according to claim 1 wherein said elastic film is made of a material selected from the group consisting of polyester, polyurethane and silicone resin and has a reflection surface on its inner surface which passes light signals of 8,050 A and 6,600 A and reflects a light signal of 5,300 A.

3. A catheter system according to claim 2 wherein said reflection surface is formed of a thin film of metal compound selected from the group consisting of magnesium fluoride, selenium dioxide and sodium fluoroaluminate.

4. A catheter system according to claim 1 wherein said first detecting means includes a motor-driven, rotatable disc having a first filter which can pass only the light signal of 6,600 A and a first phototube disposed opposite the end face of said second fiber bundle section and said disc being disposed there between with said filters in optical alignment with said phototube upon rotation of the disc.

5. A catheter system according to claim 1 wherein said correcting means includes first and second factor multipliers means for adjusting a level of the signal produced by reflection at 5,300 A in proportiion to an error component in the signals corresponding to light signals of 8,050 A and 6,600 A reflected from said elastic film and contained in the output from said first detecting means and a substractor means for substracting the outputs of said first and second factor multiplier means from the output of said first detecting means.

6. A catheter system according to claim 1 wherein said first means for receiving signals comprises a first gate means for deriving the electrical signals corresponding to the 8,050 A light signal and a second gate means for deriving the electrical signal corresponding to the 6,600 A light signal from the output of said correcting means and a calculator means for producing therefrom a signal representing the percentage content of oxygen contained in the blood; and said second means connected to the second detecting means comprises an operational amplifier means for amplifying the output of said second detecting unit, level shifter means for shifting the output of said operational amplifier means, and an inverter means for inverting the output from said level shifter to provide a signal representing the blood pressure.

* * * * *